Sept. 21, 1943.  E. G. HENRY ET AL  2,330,052
PORTABLE FASTENER SELF-FEEDING TOOL
Filed Dec. 10, 1942  2 Sheets-Sheet 2
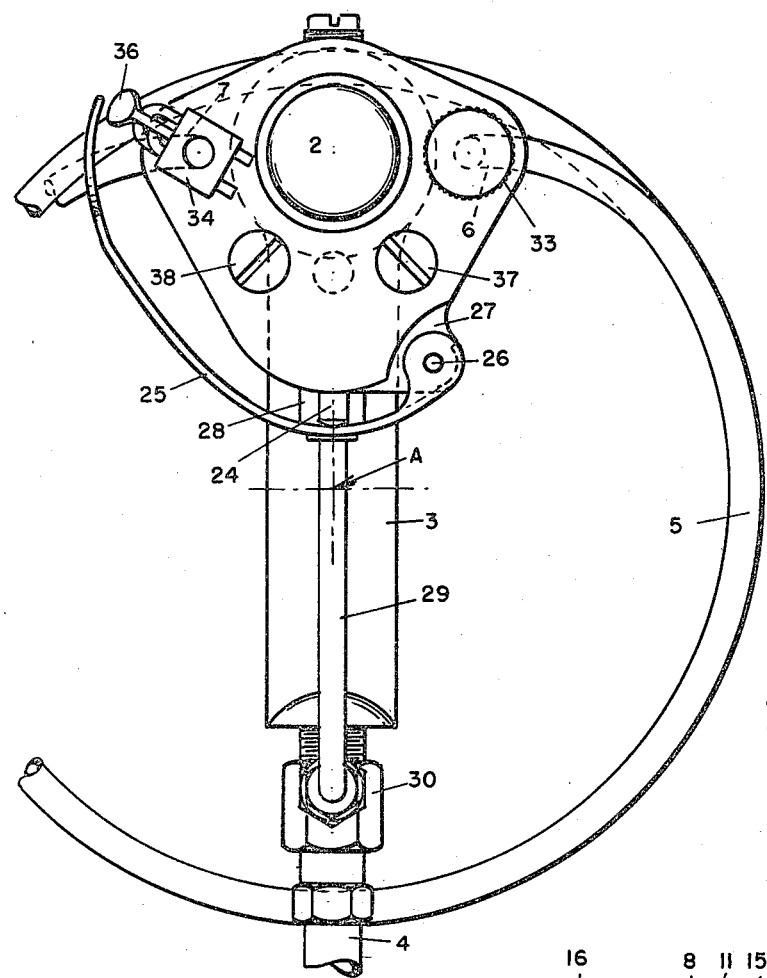
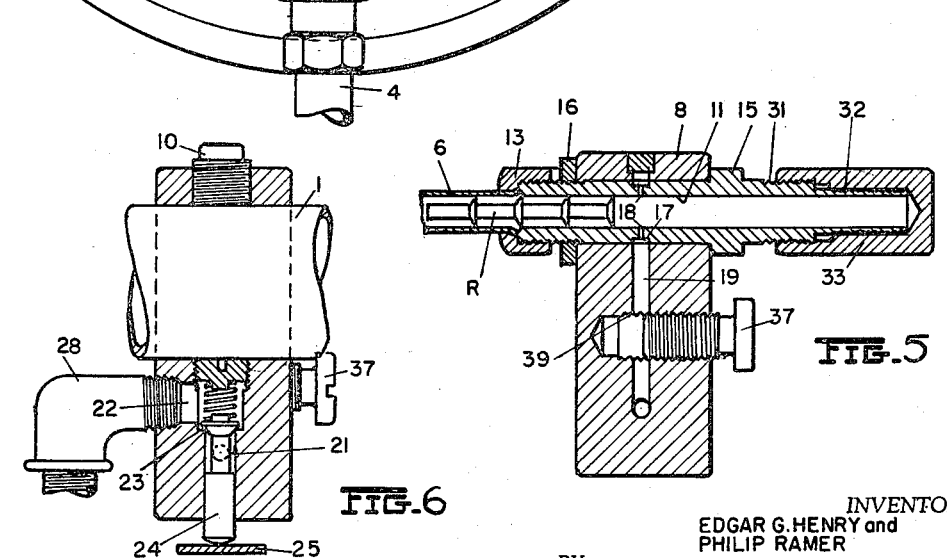
INVENTORS
EDGAR G. HENRY and
PHILIP RAMER
BY
Oberlin, Limbach & Day.
ATTORNEYS Patented Sept. 21, 1943

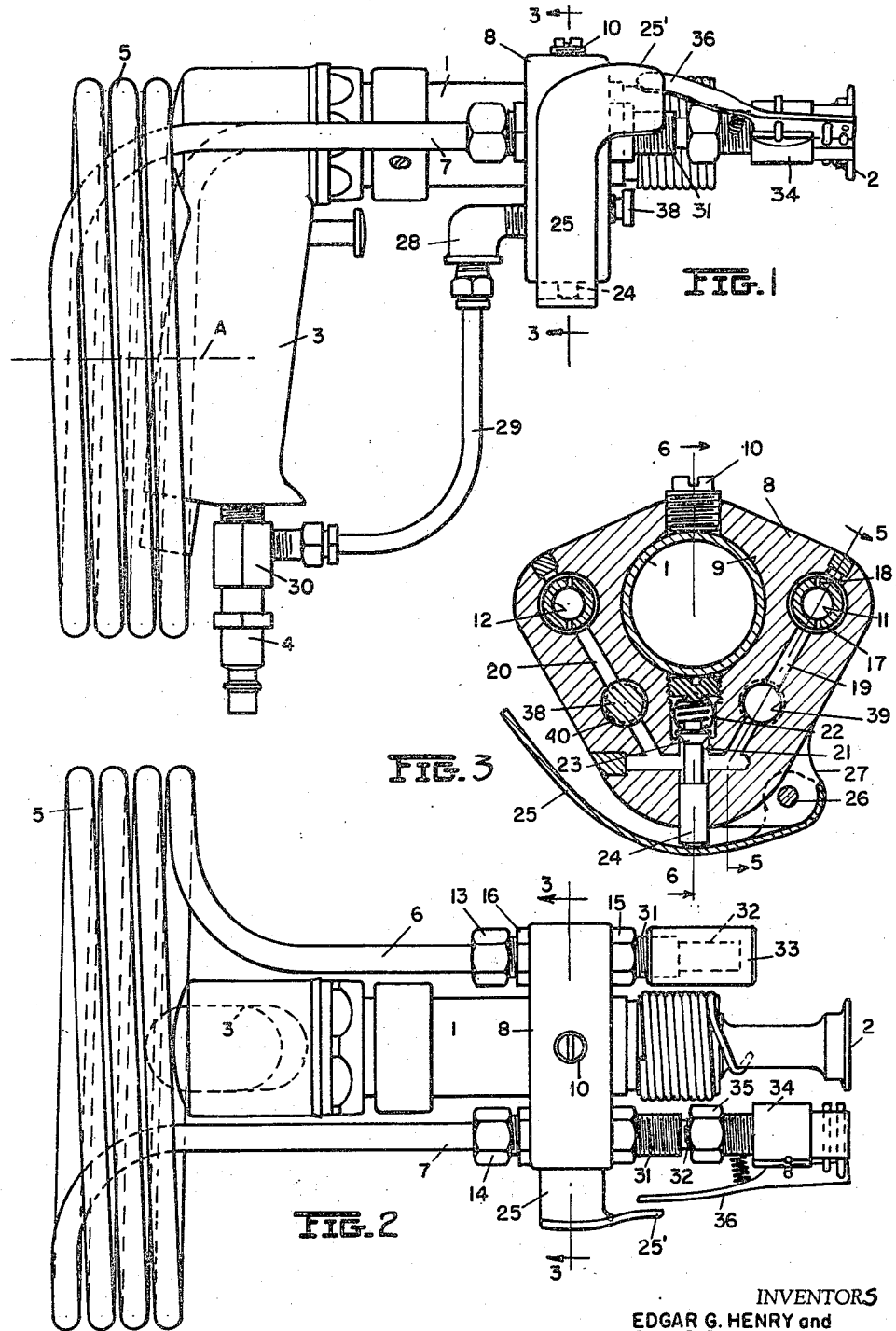

2,330,052

UNITED STATES PATENT OFFICE 2,330,052

PORTABLE FASTENER SELF-FEEDING TOOL

Edgar G. Henry, Cleveland Heights, and Philip Ramer, Cleveland, Ohio

Application December 10, 1942, Serial No. 468,586

12 Claims. (Cl. 78—48)

The present invention relates to a portable tool for operating upon fasteners such as rivets, screws, bolts, etc.; and involves the combination of a fastener feeding device with the portable power tool. Our invention is particularly well suited to portable power tools such as riveting hammers, screw guns, power drivers and wrenches, and the like, and particularly such tools which are driven by pneumatic power or air pressure.

Heretofore, in the operation of a portable power tool, such as a pneumatic riveting hammer, for example, it has been the practice to either insert the fasteners or rivets by hand or by separate rivet feeder, in place in the holes and recesses where they are to be operated upon or upset by the riveting hammer. In such prior practice, there is ample opportunity for the rivets to be dropped on the floor, worked loose from their holes before riveting, and hence lost or damaged. Further, such prior fastener feeding operations have required additional time and extra manual efforts and motions on behalf of the tool operator. Our invention eliminates these prior difficulties in that it enables the individual rivets to be fed pneumatically from a magazine carried by the portable tool itself and from a position immediately adjacent the working end or operating head of the tool, so that loss and damage of fasteners are obviated and time required for fastener insertion and extra manual operations are substantially reduced.

In the operation of the portable fastener self-feeding tool embodying our invention, the operator is not required to change his hand positions or grip upon the tool as a series of fasteners are inserted into the work and then operated upon by the tool. Thus, with our tool, the operator is enabled to feed a long series of rivets, for example, and fasten them from one and the same tool, and merely by exerting finger pressure upon an actuating lever at each rivet feeding station.

A further object of our invention is to provide a combined pneumatically operated rivet feeding device with a pneumatic portable power tool, wherein the pneumatic pressure supply for the fastener feeding device is derived directly from the single pressure supply line to the tool proper.

Another object of our invention is to provide a mounting or supporting block for attaching the fastener feeding device and a fastener magazine to the body of the power tool, such mounting block including an actuating valve and dual metering valves for adjustably regulating the direction and supply of air pressure to the fastener feeding magazine.

Still another object of our invention is to provide means whereby the fasteners or rivets can be fed from either the right or the left-hand side of the operating head of the tool, so that the fasteners can be inserted into their receiving holes in advance of the tooling operation when such operation is being conducted along a line of fasteners from right to left, or from left to right, as the case might be. This latter object is of particular advantage in airplane riveting operations, since the operator customarily changes the direction of his progressive line of movement as the change is made from one airplane wing to the other.

Another object of our invention is to so locate the fastener magazine tube, and to make it of a coiled form, whereby it is not only removed from the line of vision of the operator in handling the power tool, but is also so positioned that the convolutions of the coil serve as a protective device for the operator's hand and wrist.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevational view of a portable power tool and combined fastener feeding magazine and mechanism assembled thereon, such combination embodying the principle of our invention;

Fig. 2 is a top plan view of the device shown in Fig. 1;

Fig. 3 is a detailed section taken substantially along line 3—3 of Fig. 2;

Fig. 4 is an end elevational view of the device of Figs. 1 and 2;

Fig. 5 is a detailed section taken along line 5—5 of Fig. 3; and

Fig. 6 is a detailed section taken along line 6—6 of Fig. 3.

Now referring more particularly to the drawings, the power tool which has been selected therein for the purpose of illustration and detailed description of our invention is a pneumatic riveting hammer or gun such as is ordinarily used in aircraft fabrication. This tool essentially comprises a barrel portion 1 having the operating tool or riveting head 2 projecting from its working end and the downwardly depending pistol grip 3, to which a pneumatic pressure line is connected at the fitting 4.

A fastener or rivet holding magazine is provided in the form of the coiled tube 5 whose terminal ends 6 and 7 are carried by the mounting block 8. The mounting block 8 has a hole 9 of such a diameter as to fit over the barrel 1, and is retained thereon by means of the set screw 10.

The magazine tube 5 is thus assembled and held in position with respect to the tool body, simply through the medium of the mounting block 8. A pair of tubular fittings 11 and 12 are mounted in receiving bores in the block 8, and the terminal ends 6 and 7 of the magazine tube 5 are joined to the fittings 11 and 12 by means of the couplings 13 and 14, respectively. As will best be seen by reference to Fig. 5, the fittings 11 and 12 are secured in the mounting block 8 by means of the integral hexagonal flange 15 and the clamping nut 16.

The sleeve fittings 11 and 12 form a continuation of the ends 6 and 7 of the magazine tube 5 and have annular grooves 17 on their outside surfaces which are placed in communication with the interior bore of the fittings by means of the small radial ports 18. The grooves 17 are in turn located in alignment with the passages 19 and 20 leading from the fittings 11 and 12, respectively, to the common valve chamber 21, which in turn leads to the inlet port 22. A spring loaded poppet valve 23 is mounted in the valve chamber 21 and its stem 24 projects downwardly beyond the outside of the block 8 where it is contacted with the manual operating lever 25.

The operating lever 25 is pivotally mounted at 26 to the boss 27 on the block 8.

An elbow fitting 28 connects the inlet port 22 through the tube 29 to the T-fitting 30 on the air line fitting 4. The right-hand ends of the sleeve fittings 11 and 12 are in the form of the stepped threaded portions 31 and 32. The closure cap 33 is adapted to engage with the threaded portion 31 and the fastener feeding outlet or head 34 is adapted to engage with the smaller diameter threaded portion 32, through the medium of the coupling nut 35.

The fastener feeding head 34 may be of any suitable construction, as is previously known to those skilled in the art, and hence is not here further described or shown in detail.

The operating lever 36 of the feeding head 34 extends to a position underneath the laterally projecting portion 25' on the valve operating lever 25, and, as shown in Fig. 2, is normally spaced a slight distance therefrom. Thus, as the operating lever 25 is depressed, it first admits air to the passage 19 to force the rivets R forward in the magazine tube 5, and then depresses the lever 36 to eject or release the particular fastener or rivet which has thus been impelled into the feeder head 34.

Theaded plug valves 37 and 38 are mounted in the threaded bores 39 and 40, respectively in the passages 19 and 20.

The plug valves 37 and 38 are for the purpose of both shutting off and metering the air pressure to the passages 19 and 20. Since the pneumatic pressure from the air line delivered through the fitting 4 and for the operation of the power tool is many times greater than that required to urge or impel the series of rivets through the magazine tube 5, the metering valves 37 and 38 provide means for permitting only a partial amount of the main air flow and pressure from entering the magazine tube. Furthermore, when the direction of work progress is changed, viz., when the closure plug 33 is interchanged with the fastener feeding head 34, so that the latter is mounted on the left-hand side of the tool operating head 2 (opposite to position shown in Fig. 2), it is necessary to reverse the direction of fastener feed through the magazine tube 5. In the event of this change, the valve 37 is screwed to completely closed position, so that no air pressure enters the passage 19, and at the same time, the valve 38 is opened and adjusted to the desired position to permit the proper amount of air pressure to flow into the passage 20 and the terminal end 7 of the magazine tube 5.

The fittings 11 and 12 are preferably spaced from the axis of the operating tool at a distance which is substantially equal to the distance between points of fastener insertion, so that it is necessary for the operator to move the entire tool only slightly, if at all, after he has finished tooling one fastener or rivet and is ready to feed or insert the next fastener in the next succeeding hole.

The coils of the magazine tube 5, as will best be seen from Figs. 1 and 4, are of a diameter slightly greater than the length of the hand grip 3 and the axis of such coils, denoted by the line A, is parallel to the barrel portion 1 of the tool and passes through the hand grip 3, thus placing the coils in a position surrounding the back of the operator's hand and his wrist. By virtue of locating the coils of the magazine tube 5 in this manner, the operator's hand and wrist are protected from injury by coming into contact with some other object, such as a sharp sheet metal edge, for example. Furthermore, this configuration and location of the coils of the magazine tube 5 permits the latter to be located in a position where it does not conflict with the operator's line of vision to the front or working end of the tool; and finally, it places the weight of the magazine tube at a point with respect to the operator's gripping or support point of the body of the tool, viz., the hand grip 3, where there results a counter-balancing effect for the parts mounted upon the barrel portion 1 of the tool.

Other modes of applying the principle of the invention may be employed, change being made as regards the details described, provided the features stated in any of the following claims or the equivalent of such be employed.

We therefore particularly point out and distinctly claim as our invention:

1. A fastener feeding device for a portable pneumatic power tool such as a riveting hammer and the like, comprising a tubular fastener magazine operable by pneumatic pressure to move fasteners therethrough, an individual fastener feeding outlet positioned on one end of said magazine, a supporting member carrying said magazine, said supporting member being attachable to the body of said power tool, and means connecting pneumatic pressure from the main pressure supply to one end of said magazine whereby the latter is pneumatically operable independently of said tool.

2. A fastener feeding device for a portable pneumatic power tool such as a riveting hammer and the like, comprising a tubular fastener magazine operable by pneumatic pressure to move fasteners therethrough, an individual fastener feeding outlet positioned on one end of said magazine, a supporting member attachable to the body of said power tool and carrying said magazine and said feeding outlet with the latter in a position adjacent the working end of said power tool, and means connecting pneumatic pressure from the main pressure supply to one end of said magazine whereby the latter is pneumatically operable independently of said tool.

3. A fastener feeding device for a portable power tool such as a riveting hammer and the like, comprising a tubular fastener magazine, an individual fastener feeding outlet positioned on one end of said magazine, a supporting member carrying said magazine, said supporting member being attachable to the body of said power tool, said supporting member having air passages leading from a source of pneumatic pressure to the opposite end of said magazine, and valve means in said supporting member for controlling the flow of air in said passages.

4. A fastener feeding device for a portable power tool such as a riveting hammer and the like, comprising a tubular fastener magazine, an individual fastener feeding outlet positioned on one end of said magazine, a supporting block adapted to engage the body of said power tool, the terminal ends of said magazine being carried by said supporting block, a pneumatic pressure inlet into said block, passages in said block leading from said inlet to the points of attachment of said magazine in said block, and a control valve for admitting pressure from said inlet to said passages.

5. A fastener feeding device for a portable power tool such as a riveting hammer and the like, comprising a tubular fastener magazine, an individual fastener feeding outlet positioned on one end of said magazine, a supporting block adapted to engage the body of said power tool, the terminal ends of said magazine being mounted in said supporting block, a pneumatic pressure inlet into said block, passages in said block leading from said inlet to the points of attachment of said magazine in said block, a control valve for admitting pressure from said inlet to said passages, and a metering valve located in each one of said passages for closing and partially opening the latter.

6. A fastener feeding device for a portable power tool such as a riveting hammer and the like, comprising a tubular fastener magazine, a supporting block adapted to engage the body of said power tool, the terminal ends of said magazine being mounted in said supporting block, fittings in said block in communication with the ends of said magazine and projecting alongside the working end of said power tool, an individual fastener feeder head and a closure plug both adapted to be mounted on either one of said fittings, a pneumatic pressure inlet into said block, passages in said block leading from said inlet to the points of attachment of said magazine in said block, and a control valve for admitting pressure from said inlet to said passages.

7. A fastener feeding device for a portable power tool such as a riveting hammer and the like, comprising a tubular fastener magazine, a supporting block adapted to engage the body of said power tool, the terminal ends of said magazine being mounted in said supporting block, fittings in said block in communication with the ends of said magazine and projecting alongside the working end of said power tool, an individual fastener feeder head and a closure plug both adapted to be mounted on either one of said fittings, a pneumatic pressure inlet in said block, passages in said block leading from said inlet to the points of attachment of said magazine in said block, a control valve for admitting pressure from said inlet to said passages, and a metering valve located in each one of said passages for closing and partially opening the latter.

8. A fastener feeding device for a portable power tool such as a riveting hammer and the like, comprising a tubular fastener magazine, an individual fastener feeding outlet positioned on one end of said magazine, an operating lever for said feeding outlet, a supporting member carrying said magazine, said supporting member being attached to the body of said power tool and having air passages leading from a source of pneumatic pressure to the opposite end of said magazine, valve means in said supporting member for admitting pressure to said passages, a second operating lever for said valve means, both of said levers being movable to operating position in the same direction of movement, said second lever overlying said first lever and normally spaced therefrom in the direction of such operating movement whereby actuation of said second lever also moves said first lever in delayed sequence.

9. A fastener feeding device for a portable power tool such as a riveting hammer and the like, comprising a tubular fastener magazine, an individual fastener feeding head positioned on one end of said magazine, a supporting block adapted to engage the body of said power tool, the terminal ends of said magazine being mounted in said supporting block, a pneumatic pressure inlet into said block, passages in said block leading from said inlet to the points of attachment of said magazine in said block, a control valve for admitting pressure from said inlet to said passages, an operating lever for said feeding head, a second operating lever for said control valve, both of said levers being movable to operating position in the same direction of movement, said second lever overlying said first lever and normally spaced therefrom in the direction of such operating movement whereby actuation of said second lever also moves said first lever in delayed sequence.

10. The combination of a portable power tool such as a pneumatic hammer or the like, a pneumatically actuated fastener feeding device mounted on said tool with its fastener delivery end located adjacent the working end of said tool, a pneumatic pressure line connected to said tool and a by-pass pressure line leading from said first tool to said feeding device.

11. The combination of a portable power tool such as a pneumatic hammer and the like, having a barrel portion and a hand grip projecting downwardly therefrom, a coiled tube for receiving a plurality of fasteners and attached to said barrel portion, the convolutions of said coiled tube being of a greater diameter than the length of said hand grip and surrounding the latter, with the axis of said convolutions being parallel to said barrel portion.

12. The combination of a portable power tool such as a pneumatic hammer and the like, having a barrel portion and a hand grip projecting downwardly therefrom, a coiled tube for receiving a plurality of fasteners, a supporting block adapted to fit over said barrel portion, said tube having its terminal ends mounted in said block, the convolutions of said coiled tube being of a greater diameter than the length of said hand grip and surrounding the latter, with the axis of said convolutions being parallel to said barrel portion.

EDGAR G. HENRY.
PHILIP RAMER.